United States Patent [19]

Terunuma et al.

[11] Patent Number: 5,432,645

[45] Date of Patent: *Jul. 11, 1995

[54] MAGNETIC HEAD-FORMING THIN FILM

[75] Inventors: Kouichi Terunuma, Chiba; Masahiro Miyazaki, Yamanashi, both of Japan

[73] Assignee: TDK Corporation, Tokyo, Japan

[*] Notice: The portion of the term of this patent subsequent to Nov. 16, 2010 has been disclaimed.

[21] Appl. No.: 214,675

[22] Filed: Mar. 21, 1994

Related U.S. Application Data

[63] Continuation of Ser. No. 878,519, May 5, 1992, abandoned.

[30] Foreign Application Priority Data

Jun. 14, 1991 [JP] Japan .................. 3-170711

[51] Int. Cl.⁶ ............................................. G11B 5/235
[52] U.S. Cl. ..................................... 360/126; 148/306; 148/310; 420/128; 420/125
[58] Field of Search ............... 148/306, 310, 311, 312, 148/313, 315, 317, 318; 420/128, 435, 440, 441, 442, 452, 459, 125; 360/120, 125, 126

[56] References Cited

U.S. PATENT DOCUMENTS

| | | | |
|---|---|---|---|
| 4,836,865 | 6/1989 | Sakakima et al. | 148/306 |
| 4,969,962 | 11/1990 | Watanabe et al. | 148/306 |
| 5,084,795 | 1/1992 | Sakakima et al. | 360/120 |
| 5,117,321 | 5/1992 | Nakanishi et al. | 360/120 |

FOREIGN PATENT DOCUMENTS

| | | |
|---|---|---|
| 0286124 | 10/1988 | European Pat. Off. |
| 0288316 | 10/1988 | European Pat. Off. |
| 0380136 | 8/1990 | European Pat. Off. |
| 3-1513 | 8/1991 | Japan . |
| 3-242911 | 10/1991 | Japan . |

OTHER PUBLICATIONS

K. Nakanishi et al, "Magnetic Properties of Fe-X-N (X=Zr, Hf, Nb, Ta) Films," J. Magn. Soc. Japan, vol. 15, No. 2 (1991), pp. 371-374.

K. Nakanishi et al, "Effect Of Added Elements M (M=V, Cr, Mn, Co, Ni) On Soft Magnetic Properties Of Fe-Zr-N Films," IEEE Transactions On Magnetics, vol. 27, No. 6, Nov. 1991, pp. 5322-5324.

Digest of the 15th Annual Conference On Magnetics in Japan, Oct. 29-Nov. 1, 1991, K. Terunuma, et al., "Properties Of Fe-Zr-N Thin Films".

*Primary Examiner*—John Sheehan
*Attorney, Agent, or Firm*—Oblon, Spivak, McClelland, Maier & Neustadt

[57] ABSTRACT

The thin film of the invention for use in a magnetic head has an atomic ratio composition of the formula:

$$(Fe_{100-z}Ni_z)_{100-x-y}M_xN_y$$

wherein M is at least one member selected from the group consisting of Mg, Ca, Ti, Zr, Hf, V, Nb, Ta, Cr, Mo, W, Mn, and B, $6 \leq x \leq 14$, $6.2 \leq y \leq 15$, $0.6 \leq y/x \leq 2.0$, and $0 \leq z \leq 10$, and has a relative intensity ratio of Fe (200) peak to Fe (110) peak in an X-ray diffraction spectrum of at least 1 and high Fe (100) orientation, with a film surface oriented in (200) plane. Heat treatment improves the (100) orientation. The thin film has very high heat resistance of remaining stable at 700° C. or higher and excellent soft magnetic properties in that it has a high saturation magnetic flux density Bs, a low coercive force, a high magnetic permeability, and minimized magnetostriction. It is hard enough. The thin film exhibits improved soft magnetic properties immediately after its preparation which experience a limited range of variation with a change of heat treating conditions so that the control of heat treatment is easy. A magnetic head using such a thin film has improved overwrite properties, recording/reproducing sensitivity, and electromagnetic properties, and is highly reliable.

13 Claims, 8 Drawing Sheets

MAGNETIC HEAD-FORMING THIN FILM

This application is a Continuation of application Ser. No. 07/878,519, filed on May 5, 1992, now abandoned.

FIELD OF THE INVENTION

This invention relates to a soft magnetic thin film for use in magnetic heads, more particularly metal-in-gap (MIG) type magnetic heads, enhanced dual gap length (EDG) type magnetic heads, and thin film magnetic heads.

RELATED APPLICATIONS

This application relates to subject matter disclosed in copending U.S. patent application Ser. No. 07/617,180, filed Nov. 23, 1990 now U.S. Pat. No. 5,262,415.

BACKGROUND OF THE INVENTION

MIG type magnetic heads are known which include first and second cores of ferrite and a soft magnetic thin film of Sendust or the like on the gap-facing surface of at least one of the cores, the thin film having a higher saturation magnetic flux density Bs than the cores. These magnetic heads are effective for recording information in magnetic recording media having a high coercive force because an intense magnetic flux can be applied from the soft magnetic thin film to the media.

Also, flying type thin film magnetic heads now find commercial application by virtue of their excellent capabilities of high density recording and high speed data transfer.

Further, thin film magnetic heads use soft magnetic thin films of Permalloy, Sendust and similar materials having a high saturation magnetic flux density Bs as upper and lower magnetic pole layers for generating a high density magnetic flux.

It should be noted that these soft magnetic thin films used in magnetic heads have a saturation magnetic flux density Bs of at most about 12,000 G. Therefore, conventional magnetic heads have insufficient overwrite and other electromagnetic properties while a higher saturation magnetic flux density Bs is required for magnetic recording media having a high coercive force.

Further, Fe base soft magnetic thin films having enhanced (100) orientation are known to exhibit excellent soft magnetic properties due to low crystallographic magnetic anisotropy. However, conventional gas phase methods such as sputtering fail to form Fe base soft magnetic thin films having enhanced (100) orientation, but rather result in thin films having orientation in (110) plane or no orientation. The fabrication of thin films having enhanced (100) orientation requires the use of substrates of special materials such as ZnSe or monocrystalline substrates of GaAs or the like which have (100) orientation or an enhanced degree of (100) orientation.

Since thin films having enhanced (100) orientation can be formed only under limited conditions, it is very difficult for magnetic heads to have soft magnetic thin films which have (100) orientation or an enhanced degree of (100) orientation.

In turn, Fe-N soft magnetic thin films having a higher saturation magnetic flux density Bs than Sendust can be formed by sputtering an Fe target in a Gas mixture of Ar and $N_2$. This is because inclusion of N helps form finer crystal Grains of Fe and reduce magnetic anisotropy dispersion.

For example, Japanese Patent Application Kokai No. 15907/1989 discloses a soft magnetic thin film based on Fe and containing iron nitride in the form of $Fe_4N$ and/or $Fe_3N$. This soft magnetic thin film has magnetic properties suitable as magnetic heads as typified by a saturation magnetic flux density of 15,000 G or higher and a low coercive force Hc.

The Fe-N soft magnetic thin films, however, are less heat resistant so that they experience a rapid rise of coercive force Hc at a temperature of the order of 350° C. since their grain size increases at such temperatures.

These soft magnetic thin films are thus difficult to apply to magnetic heads of the MIG and EDG types in which temperatures of about 450° to 700° C. are encountered during glass welding and other heat treatment as well as thin film magnetic heads in which temperatures of about 350° C. or higher are encountered during film formation as by sputtering. In addition, they cannot be enhanced in (100) orientation simply by forming films on conventional substrates by sputtering and other gas phase methods.

SUMMARY OF THE INVENTION

An object of the present invention is to provide a thin film for use in a magnetic head which is resistant against heat and corrosion and has a high saturation magnetic flux density Bs and excellent soft magnetic properties as well as an MIG type magnetic head, EDG type magnetic head, and thin film magnetic head having such a thin film.

This and other objects are achieved by the present invention which is defined below as (1) to (10).

(1) A thin film for use in a magnetic head having an atomic ratio composition of the formula:

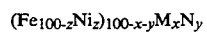

wherein M is at least one member selected from the group consisting of Mg, Ca, Ti, Zr, Hf, V, Nb, Ta, Cr, Mo, W, Mn, and B, $6 \leq x \leq 14$, $6.2 \leq y \leq 15$, $0.6 \leq y/x \leq 2.0$, and $0 \leq z \leq 10$, and having a relative intensity ratio of Fe (200) peak to Fe (110) peak in an X-ray diffraction spectrum of at least 1.

(2) A thin film for use in a magnetic head having an atomic ratio composition of the formula:

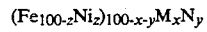

wherein M is at least one member selected from the group consisting of Mg, Ca, Ti, Zr, Hf, V, Nb, Ta, Cr, Mo, W, Mn, and B, $6 \leq x \leq 14$, $6.2 \leq y \leq 15$, $0.6 \leq y/x \leq 2.0$, and $0 \leq z \leq 10$, and having Fe (200) plane orientation in an electron diffraction spectrum.

(3) A thin film for use in a magnetic head which is obtained by furnishing a soft magnetic thin film having an atomic ratio composition of the formula:

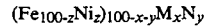

wherein M is at least one member selected from the group consisting of Mg, Ca, Ti, Zr, Hf, V, Nb, Ta, Cr, Mo, W, Mn, and B, $6 \leq x \leq 14$, $6.2 \leq y \leq 15$, $0.6 \leq y/x \leq 2.0$, and $0 \leq z \leq 10$, and heat treating said thin film so as to increase the relative intensity ratio of Fe (200) peak to Fe (110) peak in an X-ray diffraction spectrum to at least 1.

(4) The thin film for use in a magnetic head of (3) wherein the heat treatment is at a temperature of 200° to 800° C.

(5) A thin film for use in a magnetic head which is obtained by furnishing a soft magnetic thin film having an atomic ratio composition of the formula:

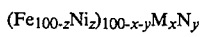

$(Fe_{100-z}Ni_z)_{100-x-y}M_xN_y$ wherein M is at least one member selected from the group consisting of Mg, Ca, Ti, Zr, Hf, V, Nb, Ta, Cr, Mo, W, Mn, and B, $6 \leq x \leq 14$, $6.2 \leq y \leq 15$, $0.6 < y/x \leq 2.0$, and $0 \leq z \leq 10$, and heat treating the thin film so as to increase Fe (200) plane orientation in an electron diffraction spectrum.

(6) The thin film for use in a magnetic head of (5) wherein the heat treatment is at a temperature of 200° to 800° C.

(7) The thin film for use in a magnetic head of any one of (1) to (6) wherein the magnetic head includes a pair of cores integrated through a thin film, and said thin film is used as the thin film.

(8) The thin film for use in a magnetic head of any one of (1) to (6) wherein a pair of cores are integrally fusion welded through the thin film using a fusion welding glass having a working temperature Tw of 450° to 750° C.

(9) The thin film for use in a magnetic head of any one of (1) to (6) wherein the magnetic head includes an upper magnetic pole layer, a lower magnetic pole layer, and a protective layer, and said thin film is used as the upper and lower magnetic pole layers.

(10) The thin film for use in a magnetic head of any one of (1) to (6) wherein the magnetic head includes a thin film magnetic circuit on a substrate, and said thin film is used as the thin film magnetic circuit.

ADVANTAGES OF THE INVENTION

The soft magnetic thin films of the present invention for use in magnetic heads are of Fe-N system and thus have a significantly high saturation magnetic flux density Bs and a low coercive force Hc. They are also advantageous in wear resistance because of high micro-Vickers hardness.

By adding a predetermined proportion (y/x) of a specific element or elements to Fe and N, depositing the resulting composition and thereafter carrying out heat treatment, soft magnetic thin films which have (100) orientation or an enhanced degree of (100) orientation can be formed. Soft magnetic properties are outstandingly improved.

In addition, the additive element or elements form more stable nitrides than Fe so that heat resistance and corrosion resistance are significantly improved while maintaining a saturation magnetic flux density Bs of at least about 14,000 G, especially at least 16,000 G.

The soft magnetic thin films of the invention have a heat resistant temperature of about 500° C. or higher, especially 550° C. or higher, more especially 600° C. or higher, provided that the heat resistant temperature is a temperature at which the coercive force rapidly changes during heat treatment, for example, a heat treating temperature at which the coercive force Hc reaches 2Oe.

In this regard, EPA 380136 discloses that an amorphous Fe-M-N thin film is deposited and then heat treated to form a (110) plane oriented film. The amorphous film as deposited does not exhibit soft magnetic properties, and (110) orientation must be imparted before the film can exhibit soft-magnetic properties.

In contrast, the thin film of the invention exhibits practically satisfactory soft magnetic properties immediately after deposition since the film has (100) plane orientation providing a (200) oriented film surface. Heat treatment enhances the degree of (100) plane orientation, resulting in further improved soft magnetic properties. The reduced dependency of the properties on heat treating conditions facilitates the control of heat treating conditions. Additionally, improved heat resistance allows heat treatment at 600° C. or higher and even at 700° C. or higher and facilitates glass welding during head fabrication.

Therefore, the soft magnetic thin films of the invention have excellent soft magnetic properties including a high saturation magnetic flux density Bs, a low coercive force Hc, and a high magnetic permeability $\mu$. Magnetostriction is low. The magnetic heads having such soft magnetic thin films according to the present invention, therefore, have improved electromagnetic properties including overwrite ability and high recording/reproducing sensitivity. In addition, the magnetic heads are well reliable since the soft magnetic thin films of the invention are resistant against corrosion and wear.

It is to be noted that Japanese Patent Application Kokai Nos. 218820/1985 and 220913/1985 disclose magnetic thin films comprising Fe, 2 to 10% by weight of Al, 3 to 16% by weight of Si, and 0.005 to 4% by weight of nitrogen. It is described that the saturation magnetic flux density Bs can be improved by partially substituting Co for Fe, and that magnetic permeability $\mu$ can be maintained high without a reduction of Bs by partially substituting Ni for Fe. However, the samples reported in Examples have a saturation magnetic flux density Bs of at most about 12,000 G despite high heat resistant temperature. There is known no soft magnetic thin film having a high saturation magnetic flux density Bs, a low coercive force Hc, and a high magnetic permeability $\mu$ as well as heat resistance.

DETAILED DESCRIPTION OF THE INVENTION

Figure 1:
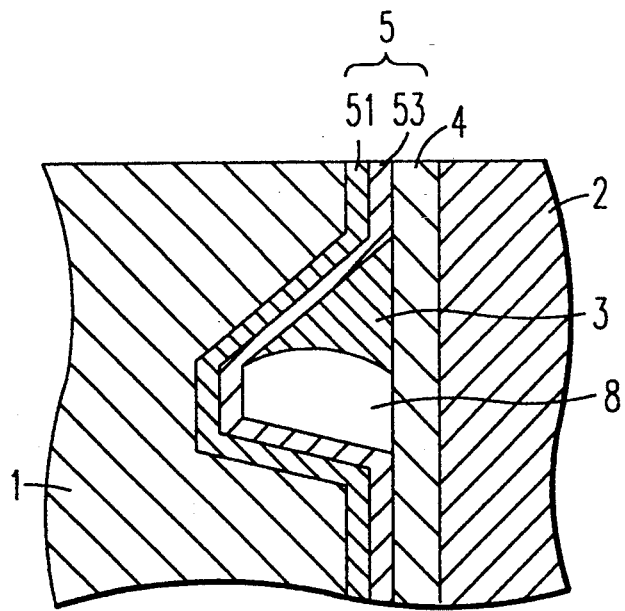
FIG. 1 is a fragmental cross section of one embodiment of the MIG type magnetic head according to the present invention.

The organization of the present invention will be described in more particularity.

The soft magnetic thin film of the present invention best suited for magnetic heads is deposited on a core or slider with an atomic ratio composition of the following formula.

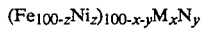

$$(Fe_{100-z}Ni_z)_{100-x-y}M_xN_y$$

In the formula, M is at least one member selected from the group consisting of Mg, Ca, Ti, Zr, Hf, V, Nb, Ta, Cr, Mo, W, Mn, and B.

Elements other than the above-listed elements, for example, Ru, cause a lowering of saturation magnetic flux density Bs and soft magnetic properties.

Among these elements, Zr alone or V alone, especially Zr alone, or mixtures of at least 20% of the entire M of Zr and/or V and any of the remaining elements other than Zr and V are preferred for enhancing (100) plane orientation.

Letter x ranges from 6.5 to 14, preferably from 7 to 12. With an x value lower than this range, heat resistance is insufficient so that the coercive force Hc may be markedly increased by heat treatment. With an x value in excess of this range, films have a lower saturation magnetic flux density Bs so that when applied to magnetic heads, overwrite property is exacerbated. Also outside the range, hardness lowers and magnetostriction increases. Within the range, there is readily obtained a soft magnetic thin film having (100) orientation or a high degree of (100) orientation and hence, significantly improved soft magnetic properties. Heat resistance is improved in that the heat resistant temperature at which Hc is 2 Oe or higher, especially 1 Oe or higher reaches 700° C. or higher, especially 750° C. or higher.

Letter y ranges from 6 to 15, preferably from 6.5 to 15. With a y value lower than this range, the effect of N to render grains finer becomes insufficient to provide soft magnetic properties. With a y value beyond this range, more nitrides of Fe, Ni and M would form than necessary, failing to provide soft magnetic properties. Better (100) plane orientation is achieved within the range. In addition to nitrogen, oxygen may be contained in an amount of up to 5 at % of the entire composition, if desired.

The lower limit of y/x is 0.6, preferably 0.65, more preferably 0.7, most preferably 0.8. The upper limit of y/x is 2.0, preferably 1.8, more preferably 1.5, most preferably 1.2. Limitation of y/x within this range facilitates formation of (100) oriented films and otherwise, (100) orientation is difficult.

Letter z ranges from 0 to 10, preferably from 0 to 5. Magnetic permeability μ is improved by adding Ni. Beyond this range, there is a tendency of saturation magnetic flux density Bs lowering. It is to be noted that when Ni is present as an essential element, its content z should preferably range from 1 to 10, more preferably from 1 to 5.

The composition of the soft magnetic thin film of the present invention may be determined by electron probe microanalysis (EPMA), for example.

The thickness of the soft magnetic thin film may be suitably selected in accordance with a particular application although it generally ranges from about 0.1 to about 10 μm.

The soft magnetic thin film of the present invention may be formed by various gas phase methods, for example, evaporation, sputtering, ion plating, and CVD. Among them, sputtering is the most preferred film forming method which may be carried out as follows, for example. The target is a cast alloy or sintered alloy while multiple source targets may also be used. Sputtering is carried out in an atmosphere of Ar or another inert gas.

In the case of reactive sputtering, the target may have approximately the same composition as the above-defined formula except N is excluded. Then sputtering is carried out in an atmosphere containing 0.1 to 15% by volume, preferably 2 to 10% by volume of $N_2$ in At. Outside this range, soft magnetic properties would not be available.

The mode of sputtering is not particularly limited and the sputtering apparatus used is not particularly limited and may be a conventional one. The operating pressure generally ranges from about 0.1 to about 1.0 Pa. The other sputtering parameters including voltage and current may be properly determined for a particular sputtering mode. The use of magnetron sputtering in a leakage magnetic field of about 100 to 500 Oe is preferred for enhancing (100) orientation. The magnetron sputtering may be of either high frequency or DC mode.

The soft magnetic thin film has (100) orientation immediately at the end of deposition although the film is preferably heat treated after deposition. The heat treatment can enhance the (100) orientation or degree of orientation, significantly improve the soft magnetic properties, and improve the saturation magnetic flux density Bs of the film.

More particularly, prior to heat treatment, the film has (100) orientation so that its (200) plane is oriented parallel to the film surface (substrate surface) and a Fe (200) peak appears in an X-ray diffraction chart. Heat treatment increases the relative intensity ratio of Fe (200) peak to Fe (110) peak to 1 or higher. As the heat treating temperature is raised, the ratio is increased to 2 or higher, especially to 3 or higher, and further infinitely in some cases, and the saturation magnetic flux density Bs is also improved.

There can be formed soft magnetic thin films having enhanced (100) orientation independent of whether the substrates on which the films are formed are magnetic materials such as ferrite, non-magnetic ceramics or polymer films.

The (100) plane orientation can be confirmed by an electron diffraction spectrum showing discontinuous diffraction rings from Fe (200) plane.

According to the present invention, in an X-ray diffraction spectrum of the film, the ratio of the relative intensity of an Fe (200) peak to the relative intensity of an Fe (110) peak is at least 1, indicating that the (100) orientation is increased over the non-oriented state. Preferably, the ratio is at least 2, more preferably at least 3. In an X-ray diffraction spectrum using CuKα, the value of 2θ of an Fe (110) peak is about 44.7 degrees and the value of 2θ of an Fe (200) peak is about 65 degrees wherein θ is a diffraction angle.

The preferred heat treating conditions are given below.

Heating rate: about 2°–8° C./min.

Holding temperature: about 200°–800° C., preferably about 400°–750° C., especially about 400°–700° C. The (100) plane orientation improves at 550° C. or higher, especially 580° C. or higher, and satisfactorily stabilizes at 600° C. or higher, especially 750° C. or higher.

Holding time: about 10–60 minutes

Cooling rate: about 2°–8° C./min.

The atmosphere may be an inert gas such as At. By carrying out heat treatment under these conditions, the soft magnetic thin films are further improved in soft magnetic properties.

The heat treatment causes the film to release resulting in a slight lowering of y. It converts to a film having a composition of the above-defined formula wherein $6.5 \leq x \leq 14$, $6 \leq y \leq 15$, $0.6 \leq y/x \leq 2.0$, and $0 \leq z \leq 10$. This means that the film of the invention experiences a slight change of composition after heat treatment. Since y/x is proximate to 1 as previously mentioned, the degree of (100) orientation is increased by the heat treatment. This is because ZrN serves as an inhibitor during growth of Fe crystal so that (100) orientation becomes preferential, and the film as deposited should have a y/x value of approximately 1. Formation of ZrN is effective for suppressing the growth of Fe crystal grains, thus improving thermal stability so that high magnetic permeability is maintained at higher temperatures. For the heat treated film, it is also preferred that x is from 7 to 12, the lower limit of y is 6.5, especially 7, the upper limit of y is 12, the lower limit of y/x is 0.65, especially 0.7, more preferably 0.8, the upper limit of y/x is 1.8, especially 1.5, more preferably 1.2, and z is from 0 to 5.

The soft magnetic thin films of the invention show the following characteristics, when they are about 1 to 5 μm thick, for example.

Coercive force Hc (50 Hz): about 0.1 to 2 Oe, especially about 0.1 to 1 Oe

Initial magnetic permeability (5 MHz): about 1,000 to 5,000, especially about 2,000 to 5,000

Saturation magnetic flux density Bs (DC): about 13,000 to 20,000 G Heat treatment improves Bs to about 1400 to 20,000 G, further to about 16,000 to 20,000 G, especially to about 17,000 to 19,000 G.

Magnetostriction: about $-2 \times 10^{-6}$ to $+2 \times 10^{-6}$

Mean grain size D of crystal grains: about 50 to 500 Å, often about 100 to 300 Å, especially about 150 to 250 Å

Micro-Vickers hardness: at least 700 Heat treatment improves the hardness to 1,100 or higher, especially to 1,150 or higher, generally up to 1,500.

The magnetic properties of soft magnetic thin films, which are to be applied to magnetic heads, for example, may be determined by forming the films on non-magnetic substrates under the same conditions as in the fabrication of magnetic heads, and heat treating them under the same conditions. The subsequent measurement is as follows.

Initial magnetic permeability ($\mu_i$) is measured by using an 8-shaped coil magnetic permeability meter and applying a magnetic field of 5 mOe.

Coercive force (Hc) is measured by means of a B-H tracer.

Saturation magnetic flux density (Bs) is measured by using a vibrating sample magnetometer (VSM) and applying a magnetic field of 10,000 G.

Magnetostriction is measured by an optical lever method under an applied magnetic field of 100 Oe.

The mean grain size of crystal grains is determined by measuring the half-width value $W_{50}$ of an Fe (200) peak in an X-ray diffraction spectrum and calculating according to the following Scherer's formula:

$$D = 0.9\lambda / W_{50}\cos\theta$$

wherein $\lambda$ is the wavelength of X-ray used and $\theta$ is a diffraction angle. The $2\theta$ value of an Fe (200) peak is about 65 degrees in an X-ray diffraction spectrum using CuKα as previously mentioned.

Micro-Vickers hardness may be measured according to JIS.

The soft magnetic thin films of the present invention are applicable to various magnetic heads, especially metal-in-gap (MIG) type magnetic heads and thin film magnetic heads. In addition to the magnetic heads, the thin films are also applicable to various soft magnetic parts, for example, thin film inductors.

Figure 2:
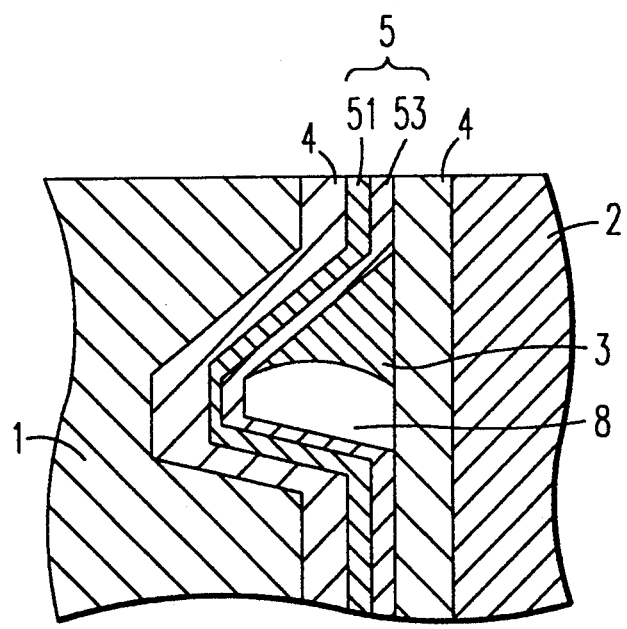
FIG. 2 is a fragmental cross section of another embodiment of the MIG type magnetic head according to the present invention.

Now, the magnetic heads of the present invention are described. FIGS. 1 and 2 illustrate two preferred embodiments of the MIG type magnetic head of the invention.

The magnetic head shown in FIG. 1 includes a first core 1 and a second core 2 having a soft magnetic thin film 4 formed on the trading side of a gap-defining opposed surface thereof. The cores are joined through a gap 5 to define a winding window 8 and integrally welded with a fusion welding glass 3.

The magnetic head shown in FIG. 2 has a soft magnetic thin film 4 on each of the gap-defining opposed surfaces of the first and second cores 1 and 2.

In the practice of the invention, the cores 1 and 2 are preferably formed of a ferrite. The ferrite used herein is not particularly limited although a choice is preferably made of an Mn-Zn or Ni-Zn ferrite depending on a particular purpose.

The Mn-Zn ferrite is preferably comprised of about 50 to 60 mol % of $Fe_2O_3$ and about 8 to 25 mol % of ZnO, the balance being essentially MnO. The Ni-Zn ferrite performs well in a high frequency range and is preferably comprised of about 30 to 60 mol % of $Fe_2O_3$, about 15 to 50 mol % of NiO, and about 5 to 40 mol % of ZnO.

The cores 1 and 2 preferably have a saturation magnetic flux density Bs of 3,000 to 6,000 G in a DC mode. With a saturation magnetic flux density below the range, a lowering of overwrite ability might occur and a composition exhibiting such a saturation magnetic flux density has a lower Curie temperature and hence, lower thermal stability. Beyond the range, the magnetic head might be adversely affected by increased magnetostriction and tends to be readily magnetized. Preferably, the cores have an initial magnetic permeability $\mu_i$ of at least about 1,000 in a DC mode and a coercive force Hc of up to 0.3 Oe. Preferably, the gap-defining opposed surfaces of the first and second cores 1 and 2 are smoothed as by mirror finishing such that undercoats and soft magnetic thin films 4 may be subsequently formed thereon with ease.

The soft magnetic thin film 4 can generate a high density of magnetic flux upon recording and is effective for recording of magnetic recording media having a high coercive force. The soft magnetic thin film 4 used herein is a soft magnetic thin film as defined by the present invention. The soft magnetic thin film 4 incorporated in the magnetic head preferably has a saturation magnetic flux density Bs of at least 14,000 G, more preferably at least 16,000 G, most preferably at least 17,000 G. Below the limit, the head has poor overwrite property and is difficult to record information in magnetic recording media having a high coercive force.

The soft magnetic thin film 4 has enhanced (100) orientation, which ensures that the film exhibit improved soft magnetic properties and high recording/reproducing sensitivity. The soft magnetic thin film 4 preferably has a mean grain size of up to 500 Å, more preferably up to 300 Å, most preferably 100 to 300 Å. Within this range, improved soft magnetic properties and high recording/reproducing sensitivity are available. With respect to soft magnetic properties, the soft magnetic thin film 4 incorporated in the magnetic head should preferably have a coercive force Hc of up to 2 Oe, more preferably up to 1 Oe at 50 Hz. The soft magnetic thin film 4 should preferably have an initial magnetic permeability $\mu_i$ of at least 1,000, more preferably at least 1,500 at 5 MHz. With a coercive force Hc beyond the range or an initial magnetic permeability $\mu_i$ below the range, there would occur a lowering of recording-/reproducing sensitivity.

The thickness of the soft magnetic thin film 4 is preferably 0.2 to 5 $\mu$m thick, more preferably 0.5 to 3 $\mu$m thick. With a film thickness below this range, the soft magnetic thin film 4 would have an insufficient overall volume to resist saturation, often failing to perform the function of an MIG type magnetic head. Beyond the range, the soft magnetic thin film 4 would have an increased eddy current loss.

The magnetic head of the invention is effective in recording information in magnetic recording media having a coercive force of at least 800 Oe by virtue of the soft magnetic thin film 4 incorporated therein.

The magnetic head provides a high output and resolution insofar as the cores 1 and 2 and soft magnetic thin film 4 have magnetic properties as mentioned above. A favorable overwrite ability of up to −35 dB is available. The resolution used herein is represented by $(V_{2f}/V_{1f}) \times 100\%$ wherein $V_{1f}$ is an output of 1f signal and $V_{2f}$ is an output of 2f signal. The overwrite ability is represented, when a 2f signal is written over a 1f signal, by a 1f signal output relative to a 2f signal output.

The gap 5 is formed of a non-magnetic material. Particularly, the gap 5 is formed of welding glass for increased bond strength, for example, the glass disclosed in Japanese Patent Application No. 71506/1989. The gap 5 may be formed solely of welding glass, but is preferably composed of two layers, gaps 51 and 53 as shown in the figures, for increasing gap formation rate and gap strength. In the latter embodiment, preferably $SiO_2$ is used as the gap 51 and welding glass is used as the gap 53.

It is to be noted that the gap 5 may be formed solely of silicon oxide in the case of magnetic heads in which welding glass 3 flows to either side of the gap as will be described later. The method for forming the gap 5 is not particularly limited although sputtering is preferred. The gap length generally ranges from about 0.2 to about 2.0 $\mu$m.

In the MIG type magnetic head of the invention, the first and second cores 1 and 2 are integrally joined through the gap 5 as shown in FIGS. 1 and 2. The cores are generally joined by heat welding the cores through the welding glass serving as gap 53 under pressure while casting fusion welding glass 3 thereto. The welding glass 3 used preferably has a working temperature Tw of 450° to 750° C., more preferably 450° to 700° C., most preferably 460° to 650° C. The working temperature Tw used herein is a temperature at which the viscosity of glass reaches 104 poise as is well known in the art.

Since the soft magnetic thin film 4 used herein is fully heat resistant, the coercive force Hc is maintained at 2 Oe or lower, especially at 1 Oe or lower even when a glass having such Tw is used for welding purposes. The welding glass 3 is not particularly limited although lead silicate glass is preferred. One exemplary preferred composition of welding glass is shown below.

| | |
|---|---|
| Pbo | ~67.5–87.5% by weight |
| $B_2O_3$ | ~4.0–8.1% by weight |
| $SiO_2$ | ~7.5–16.6% by weight |
| $Al_2O_3$ | ~0.3–0.8% by weight |
| ZnO | ~2.2–3.3% by weight |
| $Bi_2O_3$ | ~0–0.1% by weight |
| $Na_2O$, $K_2O$, CaO, etc. | ~0–4% by weight |
| $Sb_2O_3$ | ~0–1% by weight |

Welding may be carried out by conventional techniques using a welding temperature in proximity to the working temperature Tw. The welding operation can also serve for the heat treatment of the soft magnetic thin film 4.

Figure 3:
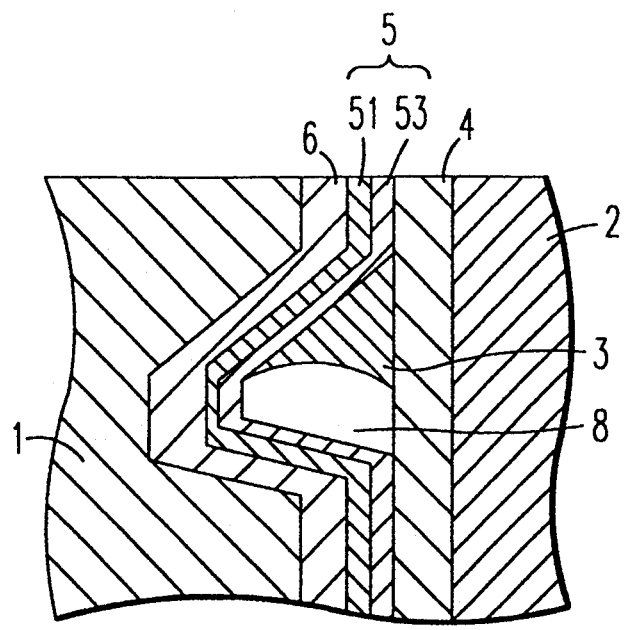
FIG. 3 is a fragmental cross section of one embodiment of the MIG type magnetic head of EDG type according to the present invention.

Also contemplated herein is an EDG type magnetic head, which is a modified MIG type magnetic head in that the first core 1 has formed thereon an alloy thin film 6 having a lower saturation magnetic flux density than the core and the second core 2 has formed thereon the above-defined soft magnetic thin film 4 as shown in FIG. 3. The EDG type magnetic head has the same advantages as the aforementioned MIG type magnetic heads. Improved overwrite property and high sensitivity are also available when the low saturation magnetic flux density alloy thin film 6 is formed, for example, from amorphous alloys having a relatively low saturation magnetic flux density as disclosed in Japanese Patent Application No. 311591/1988, which corresponds to U.S. application Ser. No. 07/356,696, filed May 25, 1989 now U.S. Pat. No. 5,029,032.

The magnetic head of the invention is integrated with a slider if necessary and finished into a head assembly. It then finds an application as magnetic heads including floppy heads capable of overwriting including those of the tunnel erase type known as laminate type heads and bulk type heads and of the read/write type without an erase head; flying heads for computers of the monolithic type and composite type; rotary heads for VCR; and heads for R-DAT. Using the magnetic head of the invention, overwrite recording can be carried out in various well-known modes.

Next, the thin film magnetic head of the invention is described.

Figure 4:
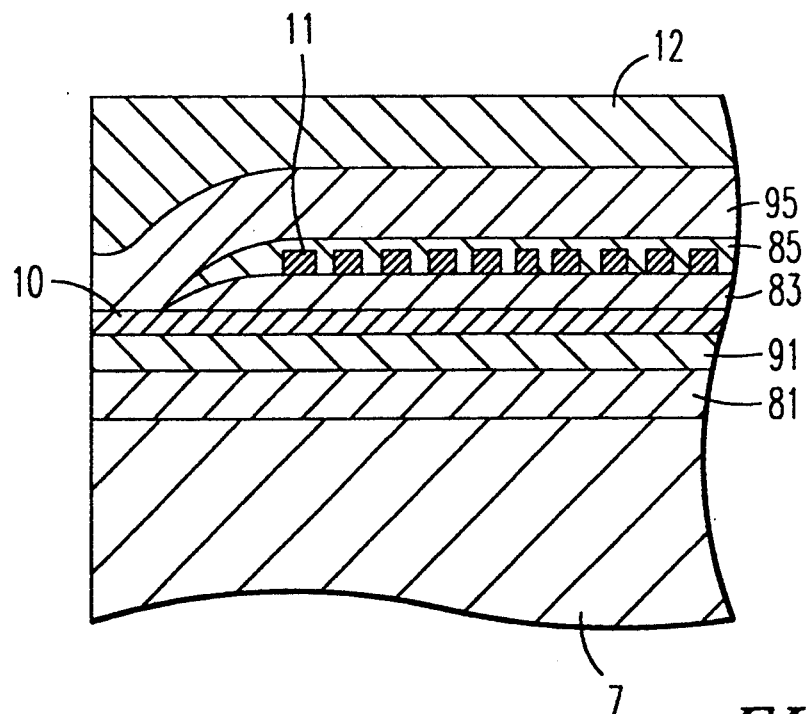
FIG. 4 is a fragmental cross section of one embodiment of the thin film magnetic head according to the present invention.

FIG. 4 illustrates a thin film magnetic head of the flying type according to a preferred embodiment of the present invention. The thin film magnetic head shown in FIG. 4 includes a slider or base 7, an insulating layer 81, a lower pole layer 91, a gap layer 10, an insulating layer 83, a coil layer 11, an insulating layer 85, an upper pole layer 95, and a protective layer 12 stacked in this order.

The slider 7 may be formed from any well-known materials including ceramics and ferrites. Examples of ceramic materials include $Al_2O_3$-TiC base ceramic materials, ZrO$_2$ base ceramic materials, SiC base ceramic materials, and AlN base ceramic materials. They may contain an additional component(s) such as Mg, Y, ZrO$_2$, and TiO$_2$. The shape and dimensions of the slider 7 may be of conventional design and suitably chosen for a particular application.

The insulating layer 81 is formed on the slider 7. The insulating layer 81 may be formed of any conventional well-known materials. For example, SiO$_2$, glass, Al$_2$O$_3$ and the like may be used if it is desired to form such layers by sputtering. The thickness and pattern of the insulating layer 81 may be of conventional design, and it is 5 to 40 μm thick, for example.

The magnetic poles are generally provided in the form of lower and upper pole layers 91 and 95 as illustrated in FIG. 4. According to the invention, the lower and upper pole layers 91 and 95 are soft magnetic thin films having an atomic ratio composition of the formula defined herein as in the case of the previously mentioned MIG and EDG/MIG type magnetic heads. The resulting magnetic head has improved overwrite property and high recording/reproducing sensitivity. Film formation and heat treatment may be carried out by the same procedures as previously mentioned.

The magnetic pole layers 91 and 95 may be of conventional well-known design with respect to their pattern, thickness and the like. The lower magnetic pole layer 91 may be about 1 to 5 μm thick and upper magnetic pole layer 95 may be about 1 to 5 μm thick, for example.

The gap layer 10 intervenes between the lower and upper pole layers 91 and 95. The gap layer 10 may be formed from any well-known material such as Al$_2$O$_3$ and SiO$_2$. The Gap layer 10 may be of conventional well-known design with respect to its pattern, thickness and the like. It may be about 0.2 to 1.0 μm thick, for example.

The coil layer 11 may be formed from any desired material, generally from a metal such as Al and Cu. No particular limits are imposed on the pattern and density of the coil. The coil may be wound in a well-known conventional manner. For example, the coil pattern may be of the spiral type illustrated in FIG. 4, laminate type or zigzag type. The coil layer 11 may be formed by gas phase deposition techniques such as sputtering or plating techniques.

In the illustrated embodiment, the coil layer 11 is spirally disposed between the lower and upper pole layers 91 and 95 while the insulating layers 83 and 85 intervene between the coil layer 11 and the lower and upper pole layers 91 and 95.

These insulating layers 83 and 85 may be formed from any well-known material, for example, SiO$_2$, Glass, and Al$_2$O$_3$ when it is desired to form the thin films by sputtering.

The protective layer 12 is disposed on the upper pole layer 95. The protective layer 12 may be formed from any well-known material, for example, Al$_2$O$_3$. The protective layer 12 may be of conventional well-known design with respect to its pattern, thickness and the like.

It may be about 10 to 50 μm thick, for example. An additional resinous coating may be laminated, if desired.

Generally, the thin film magnetic head producing process includes thin film formation and patterning. To form thin films which constitute the respective layers as described above, any well-known vapor phase deposition technique such as vacuum evaporation and sputtering, and plating techniques.

The respective layers of the head may be patterned by selective etching or selective deposition, which are both well known in the art. The etching may be either wet or dry etching.

The thin film magnetic head of the invention is usually combined with well-known members such as an arm to form a head assembly.

Using the thin film magnetic head of the invention as far described, various modes of overwrite recording can be carried out, particularly recording/reproducing operation conducted on magnetic recording media having a coercive force Hc of at least 800 Oe.

In the practice of the invention, magnetic heads can also be fabricated by forming a patterned soft magnetic thin film between non-magnetic substrates or by abutting a pair of core halves each having a soft magnetic thin film formed between non-magnetic substrates whereby the soft magnetic thin films constitute a magnetic circuit.

EXAMPLE

Examples of the present invention are given below by way of illustration.

Example 1

An MIG type magnetic head as shown in FIG. 1 was fabricated by integrally joining a first core 1 and a second core 2 having a soft magnetic thin film 4 formed on its gap-defining surface through a gap 5. The cores 1 and 2 are of Mn-Zn ferrite having a saturation magnetic flux density Bs of 5,000 G in DC, an initial magnetic permeability $\mu_i$ of 3,000, and a coercive force Hc of 0.1 Oe. The soft magnetic thin film 4 was formed by RF magnetron sputtering to a thickness of 1 μm. Sputtering was carried out in an atmosphere containing 13% by volume of N$_2$ in Ar using a target of Fe$_{0.87}$Zr$_{0.13}$ (atomic ratio) alloy. The operating pressure was 0.5 Pa.

The composition (atomic ratio) of Sample No. 1 immediately after deposition was Fe$_{84}$Zr$_8$N$_8$ as reported in Table 1.

TABLE I

| Sample No. | Composition (immediately after deposition) | | | | |
|---|---|---|---|---|---|
| | m | x | y | y/x | z |
| 1 (Invention) | Zr | 8.0 | 8.0 | 1.0 | 0 |
| 2 (Comparison) | Zr | 7.0 | 18.0 | 2.57 | 0 |
| 3 (Invention) | Zr | 9.1 | 9.7 | 1.07 | 0 |
| 4 (Invention) | Zr | 8.9 | 7.5 | 0.84 | 0 |

The saturation magnetic flux density Bs in DC mode, coercive force Hc at frequency 50 Hz, and initial magnetic permeability $\mu_i$ at frequency 5 MHz of soft magnetic thin film are shown in Table 2.

TABLE 2

| Sample No. | Heat treating temp. (°C.) | (200)/ (110) | Micro-Vickers hardness | Saturated magnetic flux density Bs (G) | Coercive force Hc (Oe) | Initial magnetic permeability $\mu_i$ (5MHz) |
|---|---|---|---|---|---|---|
| 11 (Invention) | — | 2.0 | 750 | 13,000 | 0.21 | 2,500 |
| 12 (Invention) | 500 | 2.0 | 900 | 15,000 | 0.22 | 2,500 |
| 13 (Invention) | 600 | 3.1 | 1200 | 16,500 | 0.26 | 2,300 |

TABLE 2-continued

| Sample No. | Heat treating temp. (°C.) | (200)/(110) | Micro-Vickers hardness | Saturated magnetic flux density Bs (G) | Coercive force Hc (Oe) | Initial magnetic permeability $\mu_i$ (5MHz) |
| --- | --- | --- | --- | --- | --- | --- |
| 2 (Comparison) | 600 | 0 | 1000 | 16,000 | 2.5 | 1,000 |
| 3 (Invention) | 600 | 4.5 | 1200 | 15,000 | 0.25 | 2,300 |
| 4 (Invention) | 600 | 3.8 | 1300 | 15,800 | 0.27 | 2,800 |

The heat treating temperature was 500° C. (Sample No. 12) and 600° C. (Sample No. 13) and the holding time was 60 minutes for every sample. The magnetic properties were measured by forming a soft magnetic thin film on a nonmagnetic substrate under the same conditions as used in the fabrication of the head. The measuring means were EPMA for composition analysis, a vibrating sample magnetometer (VSM) for Bs, a B-H tracer for Hc, and an 8-shaped coil permeability meter (with a magnetic field of 5 mOe applied) for $\mu_i$. All the samples had a magnetostriction amount within $\pm 2 \times 10^{-6}$ and a grain size of up to 200 Å.

The gap 51 was of $SiO_2$ which was deposited by sputtering to a thickness of 0.3 μm. The gap 53 was of a welding glass having a working temperature Tw of 650° C. which was applied by sputtering to a thickness of 0.1 μm.

The welding glass 3 was $72.50PbO-7.05B_2O_3-14.57SiO_2-0.55Al_2O_3-2.75ZnO-0.05Bi_2O_3-2.50Na_2O-0.30Sb_2O_3$ (% by weight) having a working temperature Tw of 600° C. which was welded at 600° C.

The number of coil turns was 20×2 turns. A flying magnetic head of the composite type was completed by sealingly securing the head to a slider of calcium titanate.

Using the thus fabricated magnetic head and a hard disk having a coercive force of 1,500 Oe and a track width of 14 μm, the following properties were measured. On measurement, the first core 1 was located on the hard disk leading side.

Overwrite Property

Overwrite property was evaluated by recording a signal having a frequency If of 1.25 MHz in the disk, recording another signal having a frequency 2f of 2.5 MHz thereover, and calculating the output of if signal relative to the output of 2f signal.

Recording/reproducing Sensitivity

A signal of 5 MHz was recorded and then reproduced to measure the voltage value of the reproduced output V'p-p (peak-to-peak). Values Vp-p are obtained by normalizing the measurements V'p-p.

The results are shown below.
Overwrite property: −40 dB
Vp-p: 1.20 μV/μm/turn

The sample was immersed in an aqueous solution of sodium chloride having a concentration of 5% by weight for 168 hours before the soft magnetic thin film 4 on the surface was observed under an electron microscope. Little rust was observed in Sample No. 1 according to the present invention. The sample was heat treated at 750° C. for 60 minutes, resulting in Hc of less than 1Oe.

Figure 5:
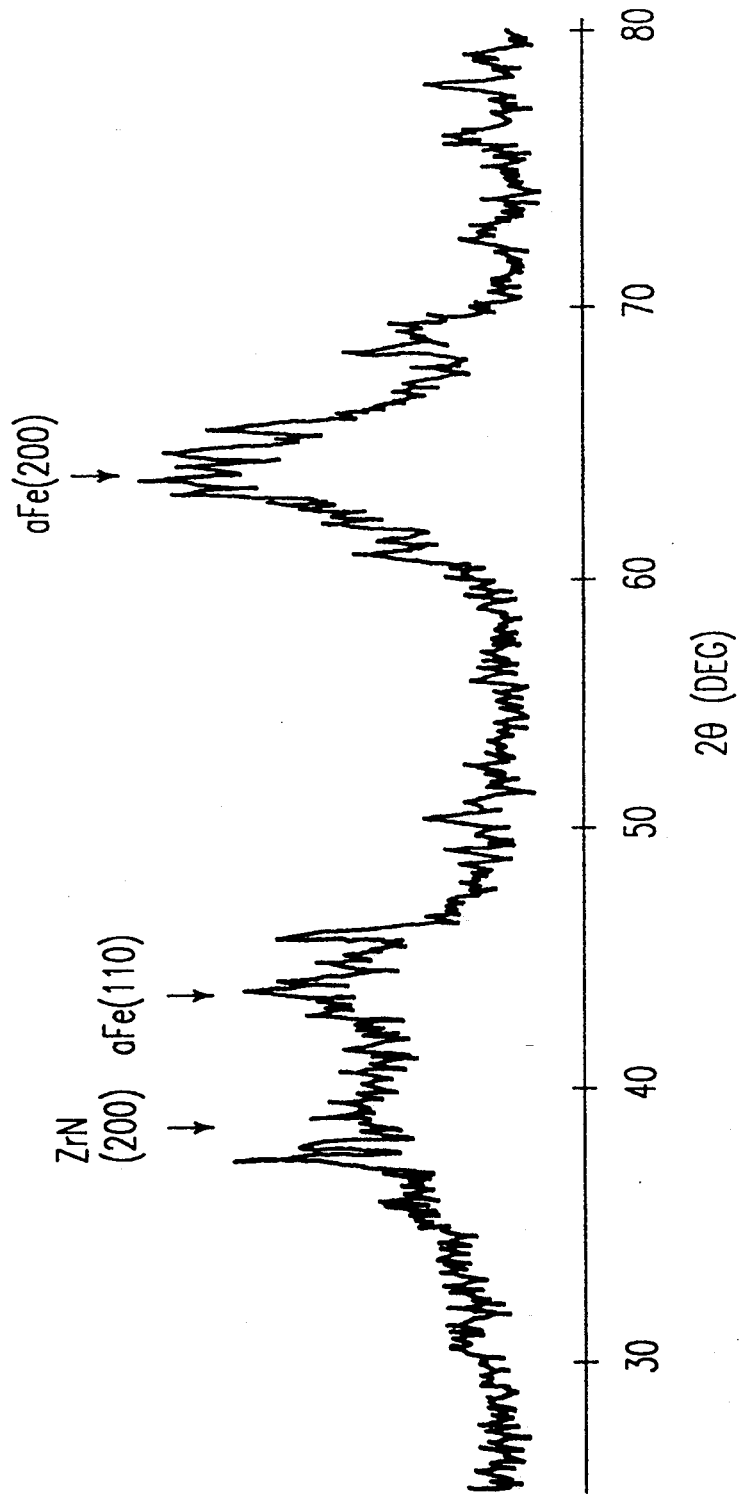
FIG. 5 is a graph showing an X-ray diffraction chart of a soft magnetic thin film according to the present invention.
Figure 6:
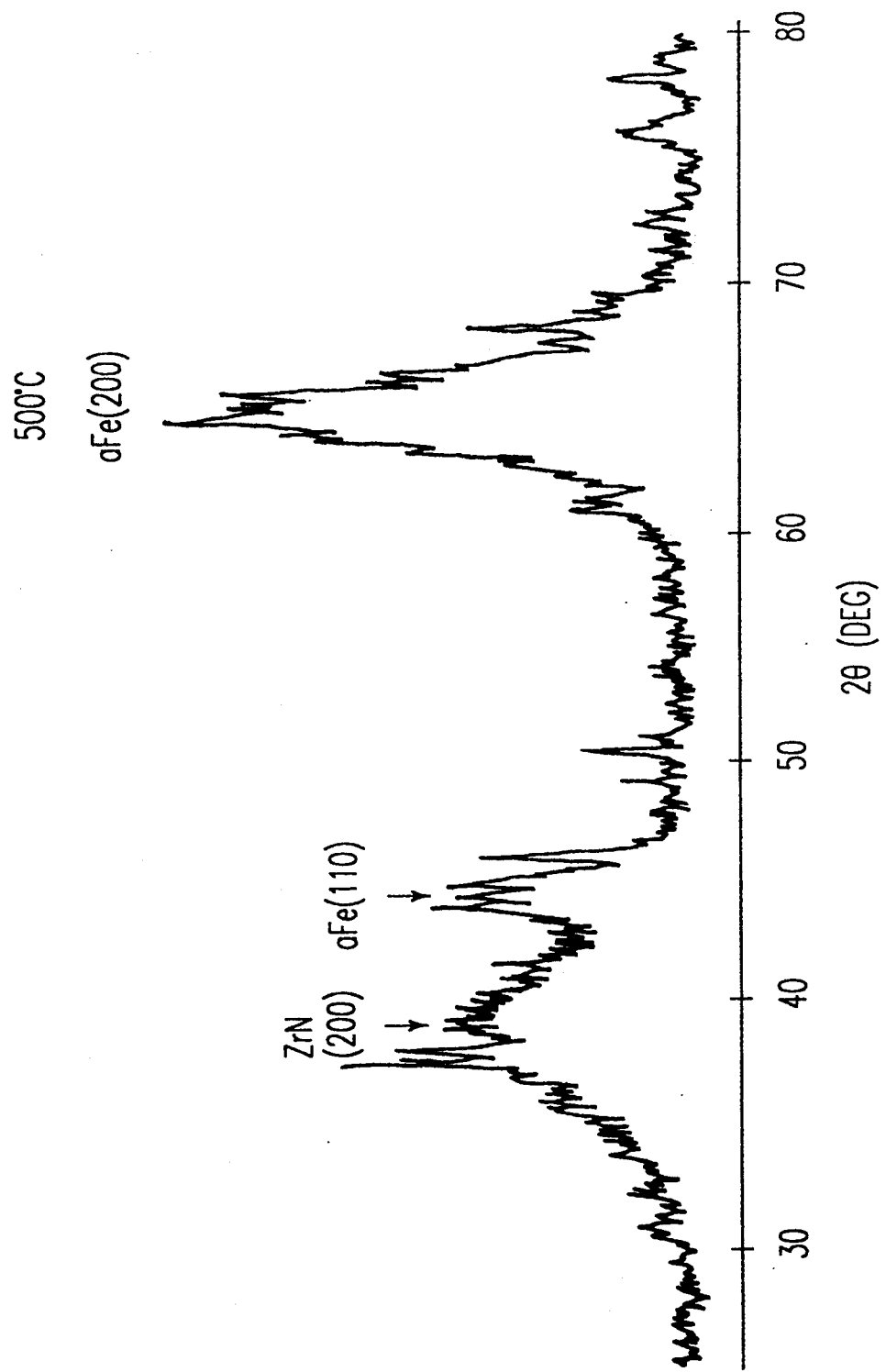
FIG. 6 is a graph showing an X-ray diffraction chart of a soft magnetic thin film according to the present invention.
Figure 7:
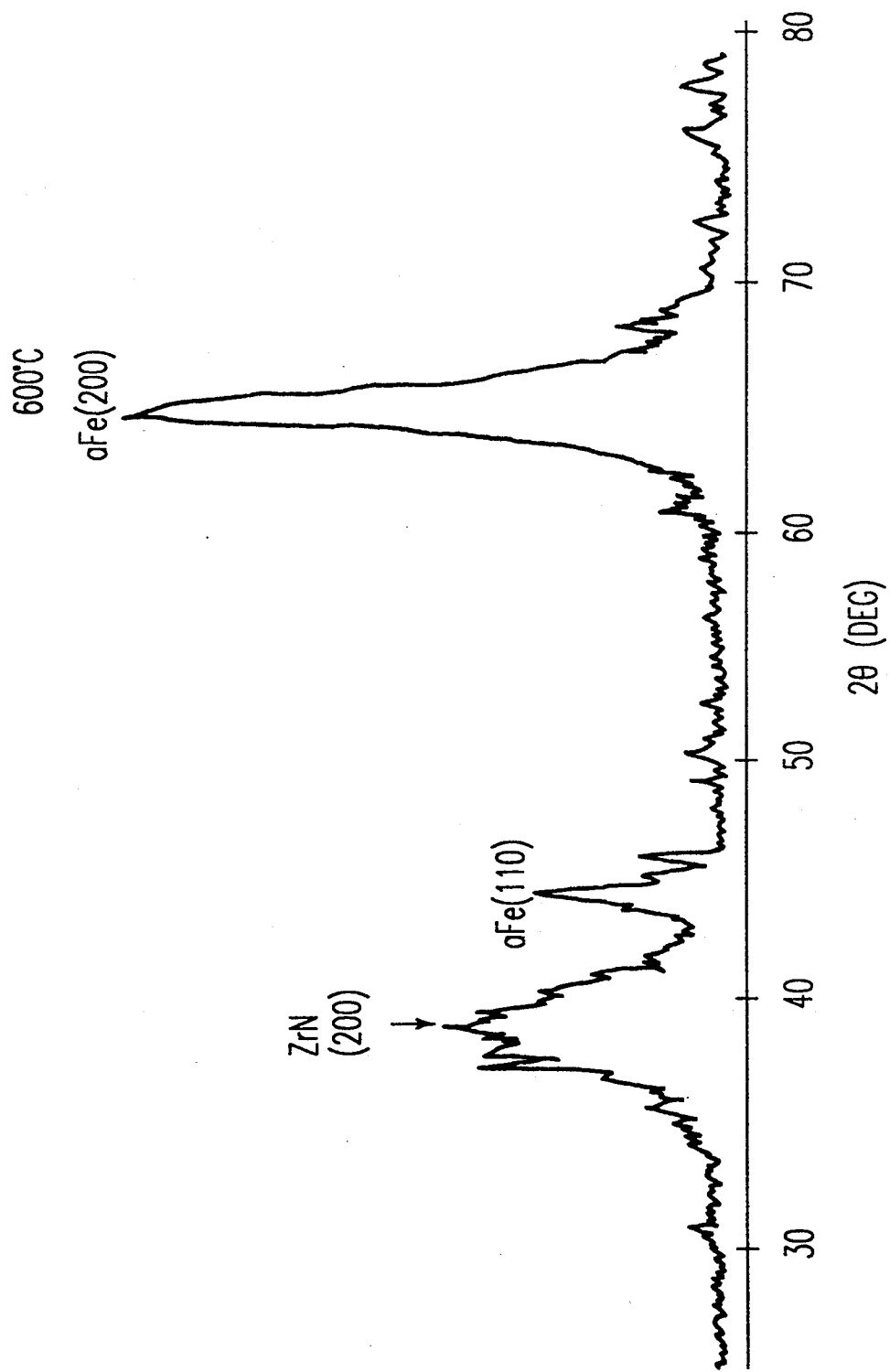
FIG. 7 is a graph showing an X-ray diffraction chart of a soft magnetic thin film according to the present invention.

FIGS. 5, 6 and 7 are X-ray diffraction spectra of the soft magnetic thin film 4 of Sample No. 1 immediately after deposition, after heat treatment at 500° C., and after heat treatment at 600° C., respectively. These charts were corrected for substrate peaks. For these spectra, the intensity of Fe (200) peak relative to Fe (110) peak is 2.0, 2.0 and 3.1, as reported in Table 2, indicating that Sample No. 1 has enhanced (100) orientation. The (100) orientation was also observed in an electron diffraction spectrum.

Comparative Example

A sample having a thin film of $Fe_{75}Zr_7N_{18}$ was fabricated under the same conditions as in Example 1 except that the target composition and the $N_2$ content in the atmosphere were changed. It was heat treated at 600° C.

The results are shown below.
Bs: 16,000 G
Hc: 2.5 Oe
$\mu_i$ (5MHz): 1,000
Overwrite property: −37 dB
Vp-p: 0.85 μV/μm/turn This sample's intensity of Fe (200) peak relative to Fe (110) peak was 0. These results reveal the benefits of (100) orientation.

Example 2

Soft magnetic thin films and metal-in-gap type magnetic heads were fabricated and measured by the same procedures as in Example 1. The composition and properties of thin films immediately after deposition are shown in Tables 1 and 2.

The heat treated soft magnetic thin films of Sample Nos. 3 and 4 showed a ratio in relative intensity of Fe (200) peak to Fe (110) peak of higher than 3, while the (100) orientation was also observed in an electron diffraction spectrum. The samples of the invention were well resistant against corrosion.

Equivalent results were obtained for additional samples which were prepared using targets of the compositional formula wherein M was changed to at least one of Mg, Ca, Ti, Hf, V, Nb, Ta, Cu, Mo, W, Mn, and B, optionally in admixture with Zr.

Example 3

An EDG type metal-in-gap magnetic head as shown in FIG. 3 was fabricated by integrally joining a first core 1 having an alloy thin film 6 having a lower saturation magnetic flux density Bs than the core formed on its gap-defining surface and a second core 2 having a soft magnetic thin film 4 formed on its gap-defining surface through a gap 5. Measurements were made as in Example 1, with equivalent results.

Example 4

A thin film magnetic head as shown in FIG. 4 was fabricated which had insulating layer 81, lower pole layer 91, gap layer 10, insulating layer 83, coil layer 11, insulating layer 85, upper pole layer 95, and protective layer 12 successively stacked on slider 7. The respective layers were formed by sputtering and patterned by dry etching.

The slider 7 was of $Al_2O_3$-TiC. The insulating layer 81 was of $Al_2O_3$ and 30 μm thick. The lower and upper pole layers 91 and 95 were soft magnetic thin films of sample Nos. 1, 3 and 4.

The lower and upper pole layers 91 and 95 were formed by RF magnetron sputtering in the same manner as the soft magnetic thin film 4 of Example 1 and each had a thickness of 3 μm.

The heat treating conditions included a heat treating temperature of 350° C. and a holding time of 60 minutes. The gap layer 10 was of $SiO_2$ and 0.25 μm thick. The coil layer 11 was formed of Cu in a spiral form as shown in the figure. The insulating layers 83 and 85 were of $Al_2O_3$. The protective layer 12 was of $Al_2O_3$ and 40 μm thick.

Magnetic head samples of the invention were fabricated in this way. Using these samples and hard disks having a coercive force of 1,500 Oe, measurements were made as in Example 1, with equivalent results.

Example 5

Figure 8:
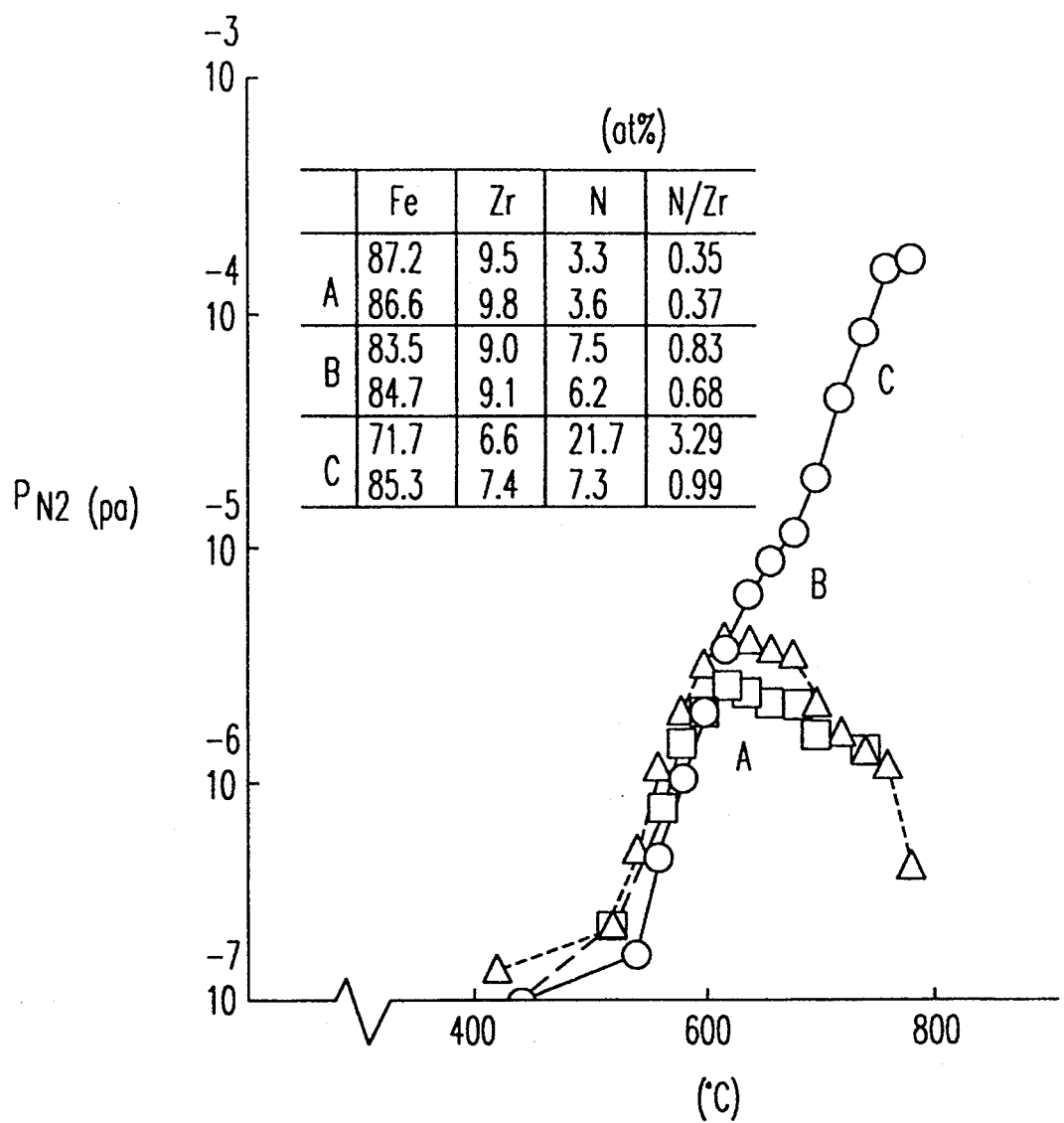
FIG. 8 is a graph showing the $N_2$ partial pressure ($P_{N2}$) relative to heat treating temperature of soft magnetic thin films according to the present invention together with their compositions before and after heating.

In accordance with Example 1, three compositions shown in FIG. 8 were deposited by RF magnetron sputtering. After deposition, each film was heated in vacuum from room temperature to 800° C. at a rate of 20° C./min. while the gases given off from the film were subject to mass analysis. FIG. 8 shows the $N_2$ partial pressure ($P_{N2}$) relative to temperature together with the film compositions before and after heating. A comparison between the film compositions before and after heating reveals a little change for compositions A and B wherein $y/x \leq 2.0$, but a larger change for composition C wherein $y/x > 1.5$.

Figure 9:
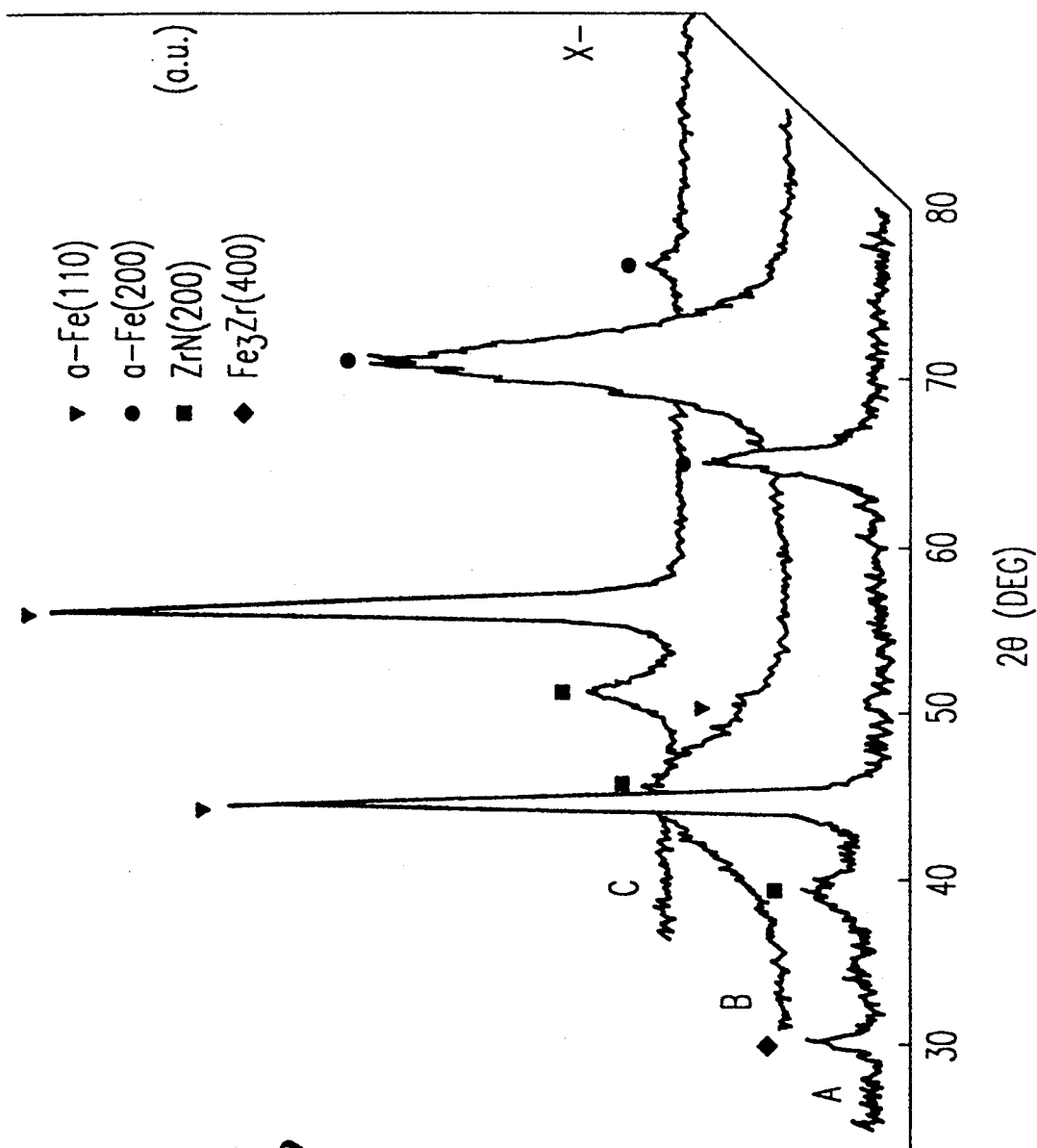
FIG. 9 is a graph showing X-ray diffraction charts of inventive and comparative soft magnetic thin films.
Figure 10:
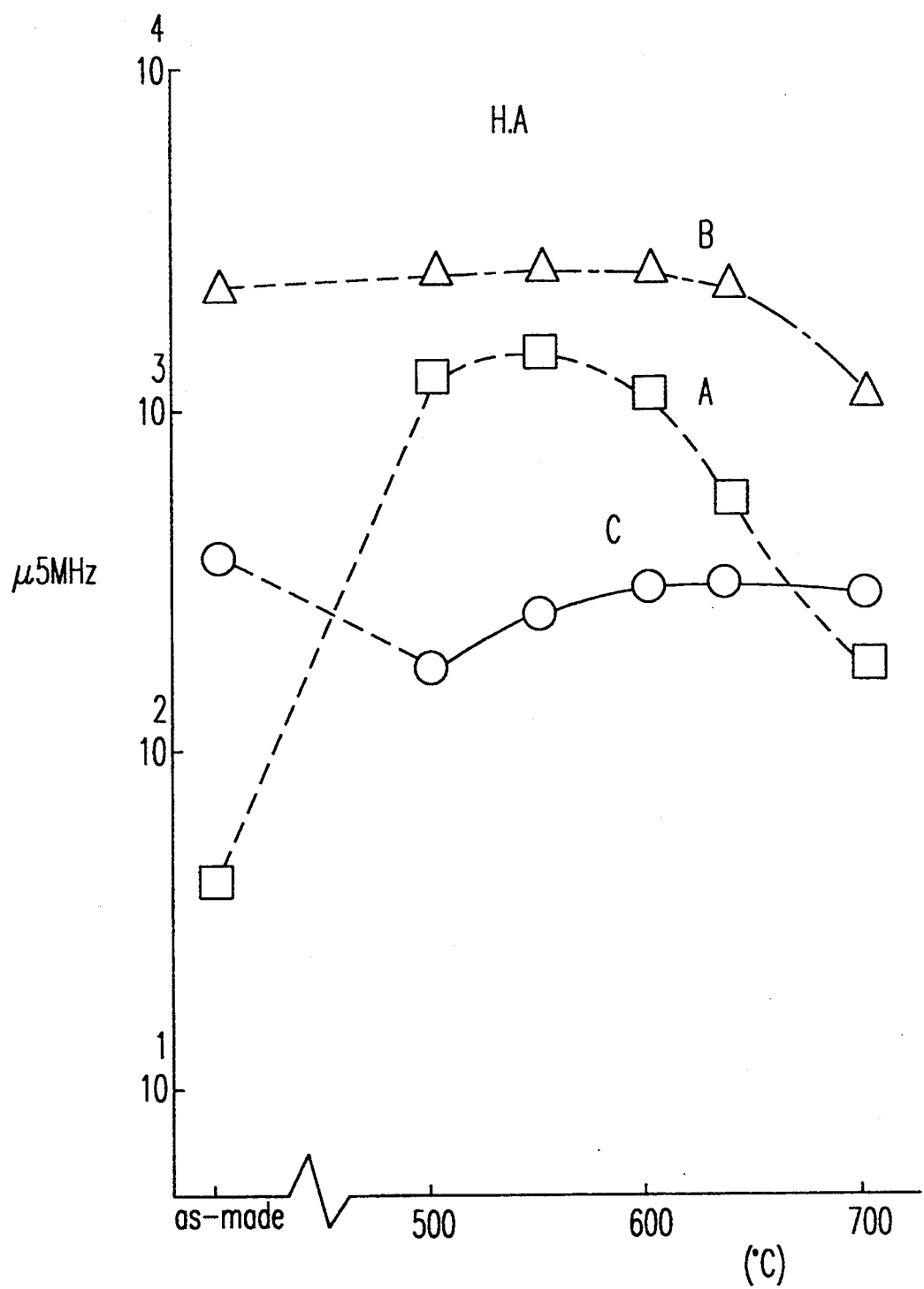
FIG. 10 is a graph showing the μ5MHz relative to heat treating temperature of inventive and comparative soft magnetic thin films.

Films A to C were coated with $SIO_2$ of about 100 μm thick and heated at 630° C. for 30 minutes, resulting in XRD of FIG. 9. Films A and C showed (110) orientation, but film B showed (100) orientation. FIG. 10 shows the heat treating temperature dependency of μ5MHz. Due to (100) orientation, film B showed significantly high thermal stability.

The foregoing data show the effectiveness of the invention.

The soft magnetic thin films of the present invention are highly resistant against heat. Especially due to enhanced (100) orientation, the films have improved soft magnetic properties including a high saturation magnetic flux density, low coercive force and high magnetic permeability. Hardness and corrosion resistance are high. The films exhibit improved soft magnetic properties immediately after their deposition. Heat treatment, if used, is easy to control.

Therefore, the magnetic heads of the present invention are easy to fabricate and have satisfactory overwrite property, high recording/reproducing sensitivity, improved electromagnetic properties, and reliability.

The soft magnetic thin films of the present invention are resistant against corrosion and wear and allow for the fabrication of highly reliable magnetic heads.

We claim:

1. A thin film for use in a magnetic head having an atomic ratio composition of the formula:

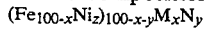

wherein M is Zr or a mixture of Zr and at least one member selected from the group consisting of Mg, Ca, Ti, Hf, V, Nb, Ta, Cr, Mo, W, Mn, and B, $6.5 \leq x \leq 14$, $6 \leq y \leq 15$, $0.7 \leq y/x \leq 1.5$, and $0 \leq z \leq 10$, and having a relative intensity ratio of Fe (200) peak to Fe (110) peak in an X-ray diffraction spectrum of at least 1.

2. A thin film for use in a magnetic head, prepared by forming a soft magnetic thin film having an atomic ratio composition of the formula:

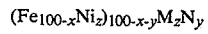

wherein M is Zr or a mixture of Zr and at least one member selected from the group consisting of Mg, Ca, Ti, Hf, V, Nb, Ta, Cr, Mo, W, Mn, and B, $6.5 \leq x \leq 14$, $6 \leq y \leq 15$, $0.7 \leq y/x \leq 1.5$, and $0 \leq z \leq 10$, and heat treating said soft magnetic thin film so as to increase the relative intensity ratio of Fe (200) peak to Fe (110) peak in an X-ray diffraction spectrum to at least 1.

3. A thin film for use in a magnetic head having an atomic ratio composition of the formula:

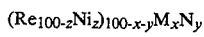

wherein M is at least one member selected from the group consisting of Ti, Hf, V, Nb, Ta and Mo, $6.5 \leq x \leq 14$, $6 \leq y \leq 15$, $0.6 \leq y/x \leq 1.8$, and $0 \leq z \leq 10$, and having a relative intensity ratio of Fe (200) peak to Fe (110) peak in an X-ray diffraction spectrum of at least 1.

4. A thin film for use in a magnetic head, prepared by forming a soft magnetic thin film having an atomic ratio composition of the formula:

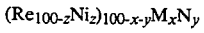

wherein M is at least one member selected from the group consisting of Ti, Hf, V, Nb, Ta and Mo, $6.5 \leq x \leq 14$, $6 \leq y \leq 15$, $0.7 \leq y/x \leq 1.5$, and $0 \leq z \leq 10$, and heat treating said soft magnetic thin film so as to increase the relative intensity ratio of Fe (200) peak to Fe (110) peak in an X-ray diffraction spectrum to at least 1.

5. The thin film for use in a magnetic head of claim 1, 2, 3 or 4 wherein the said heat treating is at a temperature of 200° to 800° C.

6. A magnetic head, comprising the thin film of claim 1, 2, 3 or 4 and a pair of cores integrated through said thin film.

7. The magnetic head of claim 6, wherein said pair of cores are integrally fusion welded through said thin film using a fusion welding glass having a working temperature Tw of 450°–750° C.

8. A magnetic head, comprising:
a protective layer,
an upper magnetic pole layer made from the thin film of claim 1 or 2 disposed on said protective layer, and
a lower magnetic pole layer made from said thin film, disposed on said upper magnetic pole layer.

9. The magnetic head of claim 8, further comprising:
a first insulating layer, disposed between said upper pole layer and said lower pole layer,
a coil layer, disposed between said first insulating layer and said lower pole layer,
a second insulating layer, disposed between said coil layer and said lower pole layer,
a gap layer, disposed between said second insulating layer and said lower pole layer,
a third insulating layer, disposed on the surface of said lower pole layer opposing said gap layer, and
a slider or base, disposed on the surface of said third insulating layer opposing said lower pole layer.

10. A magnetic head, comprising a substrate and a circuit formed thereon, said circuit comprising the thin film of claim 1, 2, 3 or 4.

11. The thin film of claim 1, or 2 wherein M is Zr.

12. The thin film of claim 1, 2, 3 or 4, wherein said relative intensity ratio of Fe (200) peak to Fe (110) peak is at least 2.

13. The thin film of claim 6, wherein said relative intensity ratio of Fe (200) peak to Fe (110) peak is at least 3.

* * * * *

UNITED STATES PATENT AND TRADEMARK OFFICE
CERTIFICATE OF CORRECTION

PATENT NO. : 5,432,645

DATED : JULY 11, 1995

INVENTOR(S) : Kouichi TERUNUMA, ET AL.

It is certified that error appears in the above-indentified patent and that said Letters Patent is hereby corrected as shown below:

Claim 1, Column 15, line 61, "$Fe_{100-x}Ni_z)_{100-x-y}M_xN_y$"

should read --$Fe_{100-z}Ni_z)_{100-x-y}M_xN_y$--

Claim 2, Column 16, line 5, "$Fe_{100-x}Ni_z)_{100-x-y}M_xN_y$"

should read --$Fe_{100-z}Ni_z)_{100-x-y}M_xN_y$--

Claim 3, Column 16, line 17, "$Re_{100-z}Ni_z)_{100-x-y}M_xN_y$"

should read --$Fe_{100-z}Ni_z)_{100-x-y}M_xN_y$--

Claim 3, Column 16, line 21, "$0.6 \leq y/x \leq 1.8$"

should read --$0.7 \leq y/x \leq 1.5$--

UNITED STATES PATENT AND TRADEMARK OFFICE
CERTIFICATE OF CORRECTION

PATENT NO. : 5,432,645
DATED : JULY 11, 1995
INVENTOR(S) : Kouichi TERUNUMA, ET AL.

It is certified that error appears in the above-indentified patent and that said Letters Patent is hereby corrected as shown below:

In Claim 4, Column 16, line 29, "$(Re_{100-z}Ni_z)_{100-x-y}M_xN_y$"

should read --$Fe_{100-z}Ni_z)_{100-x-y}M_xN_y$--

In Claim 13, Column 18, line 3, "Claim 6"

should read --Claim 12--

Signed and Sealed this

Nineteenth Day of December, 1995

Attest:

BRUCE LEHMAN

Attesting Officer  Commissioner of Patents and Trademarks